June 8, 1943.  K. RATH  2,321,420

EXPOSURE DETERMINING DEVICE

Filed April 21, 1942  2 Sheets-Sheet 1

INVENTOR.

Patented June 8, 1943

2,321,420

UNITED STATES PATENT OFFICE 2,321,420

EXPOSURE DETERMINING DEVICE

Karl Rath, New York, N. Y.

Application April 21, 1942, Serial No. 439,827

9 Claims. (Cl. 88—23)

My invention relates to improvements in extinction type optical photometers, more particularly to a photographic exposure meter which may serve as a separate accessory to a camera for determining the proper exposure settings or which may be structurally combined with the exposure control organs of a camera to obtain an automatic adjustment of the lens aperture and exposure time to insure a correctly exposed photograph of an object or scene of given brightness and under various other exposure determining conditions, in particular film speed or emulsion sensitivity.

As is well known, the results obtained with ordinary extinction type exposure meters, in particular those held and read at a distance from the eye, are largely dependent on the sensitivity or ability to distinguish between detail or contrast of the human eye serving as the judge of the extinction reading or adjustment of a test mark to a point approaching zero visibility, which sensitivity is subject to substantial variations depending on the average lighting conditions to which the eye is exposed. Thus, a reading taken from an object of given brightness in bright sunlight will result in a substantially different exposure than would be obtained if the same object were taken under a clouded sky or located indoors due to the greatly increased eye sensitivity under the reduced lighting conditions to which the eye is exposed in the latter case.

Accordingly, it is an object of my invention to provide a novel extinction type exposure meter embodying simple means for taking into account the effects of the varying eye sensitivity under different average lighting conditions.

Another object is the provision of an extinction type exposure meter suitable both as an independent accessory to a camera or for direct structural embodiment in a camera, and which can be adjusted and operated in an easy and simple manner to insure a correctly exposed photograph under various exposure controlling conditions including the general lighting conditions to which the eye is exposed at the time of effecting an exposure reading or adjustment.

Figure 1:
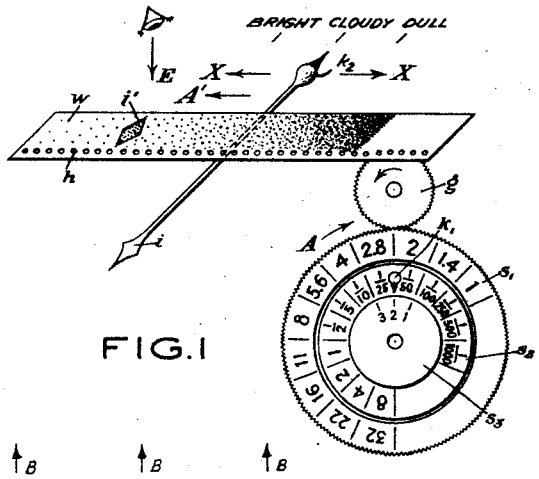
Figures 2, 3, 4:
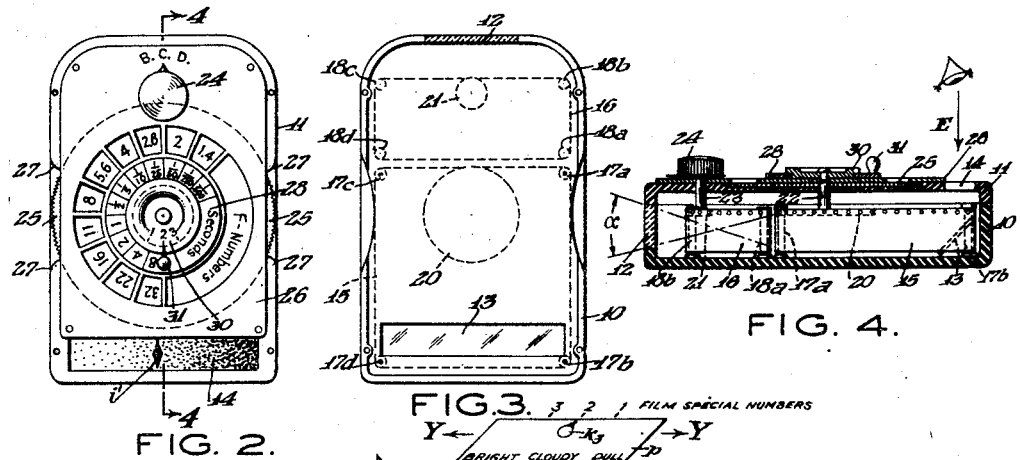
Figure 5:
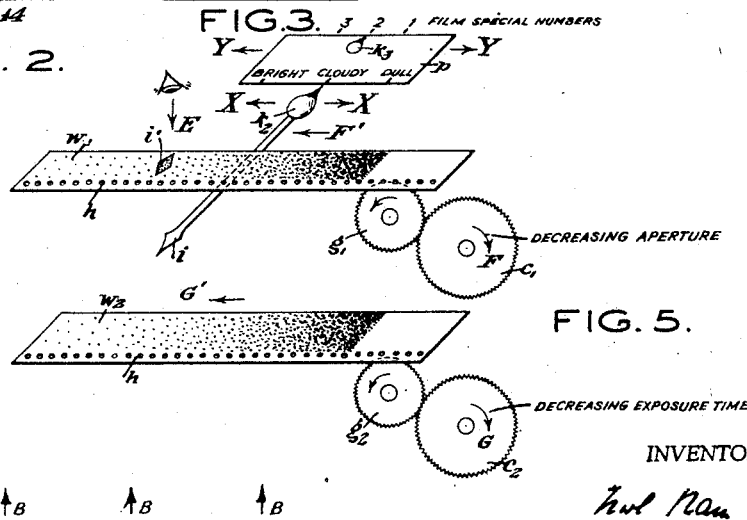
Figure 6:
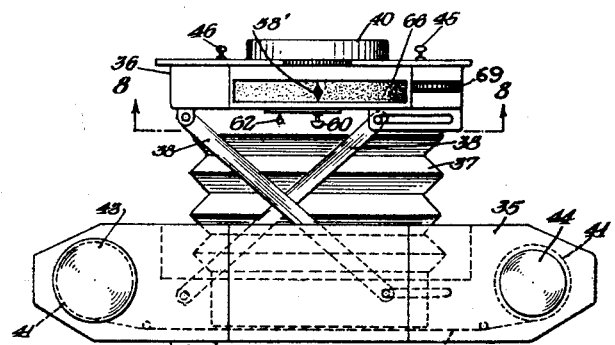
Figure 7:
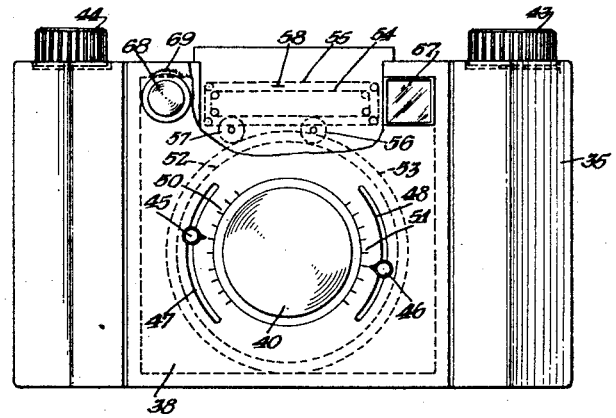
Figure 8:
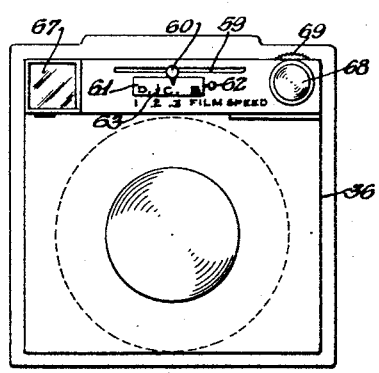
Figure 9:
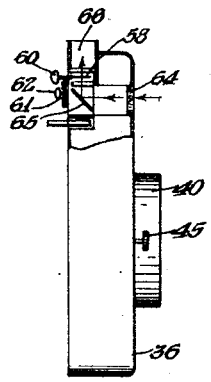

Further objects and advantages of my invention will become more apparent from the following detailed description taken with reference to the accompanying drawings forming part of this specification and wherein:

Figure 1 is a schematic diagram showing the layout of an exposure meter designed for use as an separate accessory for a camera and embodying the principles of the invention; Figures 2 and 3 are top views, the latter with the cover removed, of a structural embodiment of an exposure meter designed according to Figure 1; Figure 4 is a cross-sectional view taken on line 4—4 of Figure 2; Figure 5 is a schematic diagram of an exposure meter embodying the principles of the invention and adapted for structural combination with a camera to obtain an automatic exposure adjustment; Figure 6 is a top view of a collapsible bellows type camera embodying a built-in exposure meter constructed according to Figure 5; Figure 7 is a front view of the camera shown in Figure 6; Figure 8 is a partial view of the camera showing the rear of the lens and shutter housing containing the exposure meter; and Figure 9 is a side view, partially broken away, of Figure 8.

Like reference characters identify like parts throughout the different views of the drawings.

Referring more particularly to Figure 1, I have shown a photometric or step wedge $w$ in the form of a plate or strip having a density or opacity which increases gradually or step-by-step from one end to the other, in the example shown from left to right and which serves as an adjustable light-dimming element to cause a stationary test mark or index $i'$ to be just barely visible, when the wedge viewed by an observer from one side in the direction E is illuminated from the other side by light rays emanating from a photographic object or scene in the reading position of the meter, said light rays being indicated in the drawings by arrows B. The mark $i'$ upon the wedge is produced by the shadow of a pointer $i$ placed in the path of the incident light rays B.

In order to move the wedge $w$ over the pointer $i$, it is provided with a series of marginal perforation $h$ similar to a moving picture film, said perforation being engaged by a sprocket or toothed wheel $g$ which in turn meshes with a toothed adjusting ring or scale member $s_1$. Accordingly, by turning ring $s_1$, a portion of suitable density of the wedge $w$ may be brought opposite to the pointer $i$, whereby the mark or shadow $i'$ will be just barely discernible or its visibility reduced to a point approaching the zero value. The extent of displacement of the wedge $w$ or rotation of scale member $s_1$ is then a measure of the intensity of the light rays B, i. e., in turn of the brightness of the object or scene to be photographed. Measurements of this type involving the reduction to zero of a given indication by a balancing or dimming device are generally known as null or compensation methods.

The adjustment of scale $s_1$ in accordance with the object or scene brightness in the manner described may be utilized to determine the proper camera exposure values by combining scale $s_1$ with other cooperating scales of a computer or calculating device of any suitable design such as shown by way of example in the drawings. According to the latter, the annular scale $s_1$ is calibrated in suitable relative lens aperture numbers ranging, in the example illustrated, from 1 to 32 according to the well known F-system, wherein transition from one to the next aperture number will require a doubling or halving of the final exposure. In addition to scale $s_1$, I have shown a second ring-shaped scale $s_2$ calibrated in exposure time values, i. e., from one $1/1000$ sec. to 16 sec. in the example shown. Scale $s_2$ is rotatably mounted inside scale $s_1$ and may be adjusted by means of a knob $k_1$ having a pointer or index moving along a third stationary scale $s_3$ arranged inside scale $s_2$ and being calibrated in film or emulsion speed values indicated as 1, 2 and 3 and representing relatively slow, medium and high speed emulsions at present in common use for average photographic purposes. Other film speed numbers may be added if desirable.

In operation, knob $k_1$ is first set so that its index is opposite to the speed number of the film or plate used in the camera, thereby adjusting scale $s_2$ to a predetermined position relative to scale $s_1$. The latter is then in turn adjusted according to the existing object brightness by causing the index $i'$ on wedge $w$ to become just barely visible in the manner described, whereupon aperture and exposure time scales $s_1$ and $s_2$ will be properly aligned so that any pair of coordinated values appearing opposite each other may be selected by the photographer for effecting an exposure in a manner well understood by those skilled in the art. As is understood, aperture and exposure time scales may be interchanged without affecting the operation of the meter.

In the example shown, rotation of scale $s_1$ in the direction of arrow A will result in a decreased exposure since a smaller aperture or larger F-number will come opposite to a given exposure time on scale $s_2$. Again, rotation of scale $s_1$ in the direction of arrow A will result in a displacement of the wedge $w$ toward the left in the direction of arrow A' whereby denser portions of the wedge will come opposite to the index $i$. Accordingly, if the intensity of the light rays B increases due to increased scene or object brightness, the wedge will have to be moved in the direction of arrow A' to bring a denser portion thereof opposite to the index $i$ so as to cause the mark or shadow $i'$ to disappear or remain just barely visible. The result of this adjustment as follows from the above, will be a decreased exposure reading, as should be the case if the object or scene brightness has increased as assumed. Vice versa, if the object brightness decreases the wedge $w$ will have to be moved in a direction opposite to the arrow A' to cause index $i'$ to remain barely visible, i. e., scale $s_1$ must be rotated in the direction opposite to the arrow A, resulting in an increased exposure indication.

According to the present invention, the construction of an exposure meter embodying a relatively adjustable wedge and test mark or index to be brought to a point close to zero visibility is such that the wedge or a substantial part thereof is at all times visible to the observer compared with known meters of this type wherein only a small fraction of the wedge is viewable through a peep hole or aperture. This construction not only has the advantage that the point of extinguishment of the index or test mark $i'$ can be ascertained in a more easy and accurate manner if the entire wedge or a greater part thereof is viewed by the observer, but makes it possible according to a further feature of the invention to adjust the pointer $i$ to different initial positions relative to wedge $w$ to take into account additional secondary exposure controlling factors, other than the main exposure controls, i. e., lens aperture and exposure time to be adjusted for each exposure, such as film speed, filter factors or in particular the general lighting conditions to which the eye is exposed, to compensate for the error due to the varying eye sensitivity. An arrangement of this type shown schematically in Figure 1 will be described in the following.

Let it be assumed, that an adjustment has been made for a given scene brightness or intensity of the incident light rays B and under medium average lighting conditions such as on a lightly clouded day, whereby scales $s_1$ and $s_2$ will be aligned as shown in the drawings, i. e., that an aperture of F 2.8 and exposure time of $1/25$ sec. will result in a correctly exposed photograph for a medium film speed 2 in the example shown. If now all the conditions remain the same except that the general lighting conditions will change in the "bright" direction such as to sunny surroundings, the eye being exposed to the stronger light will assume a lower sensitivity. Accordingly therefore, wedge $w$ will have to be moved to a lesser distance in the direction of arrow A' to cause shadow $i'$ to become barely visible; in other words, the next greater aperture, i. e., F 2 in the example shown, will be opposite to the exposure time $1/25$ sec., resulting in an overexposed picture. In order to compensate for this error, according to the invention, the index $i$ is displaced in the direction of the arrow A' by the aid of the adjusting knob $k_2$ until the pointer attached to said knob is opposite a relatively fixed mark of a scale of lighting conditions identified by the word "Bright." As a result, the wedge must be moved over the same distance as in the case of the lower general lighting conditions to cause the index $i'$ to just disappear, resulting in substantially the same relative adjustment or alignment of scales $s_1$ and $s_2$, as should be the case in view of the fact that the object brightness which alone determines the final exposure has been assumed to remain unchanged.

On the other hand, if the general lighting conditions change in the "dark" direction such as to a heavily clouded sky or scenes taken indoors, the eye sensitivity which in this case will be increased will result in an increased movement of the wedge $w$ in the A' direction in order to cause index $i'$ to just disappear, thus resulting in the next greater aperture number; i. e., F:4 in the example chosen, to come opposite the exposure time number $1/25$ sec., which is equivalent to an underexposed picture. In order, in this case, to obtain the same displacement of the wedge $w$ or rotation of scale $s_1$, the index $i$ is moved to the right to align the pointer of adjusting knob $k_2$ with the mark identified "Dull" of the scale representing the general lighting conditions. In this manner, scales $s_1$ and $s_2$ will again be properly aligned, resulting in the correct exposure indications independently of the effect of the varying eye sensitivity. If desired, more than three general lighting conditions may be chosen for adjusting pointer $i$ in the direction of either arrows X to obtain any desired degree of accuracy. For practical purposes it has been found that the three average values representing the general lighting conditions shown in the drawings are satisfactory for the majority of cases and can be easily judged by the photographer after short experience.

The employment of an index or test mark displaceable relative to an optical wedge for the purpose described makes it necessary for the observer to view the entire wedge or a substantial part thereof illuminated by the light rays B which emanate from the photographic scene or object, as provided in the structural embodiment of a meter of this type illustrated in Figures 2, 3 and 4 and described in the following.

In the latter, the numeral 10 indicates a flat rectangular casing of any suitable material such as a molded plastic having a top or cover 11 secured thereto in any suitable manner and being provided with a light admitting opening in the front wall thereof advantageously covered by a diffusing plate 12 of frosted glass or the like, and an inclined mirror or reflector 13 mounted within said casing at the side opposite to said plate. In this manner, light rays emanating from a photographic object entering through the diffusing plate 12 in the operative position of the meter, whereby said plate acts as a secondary light source having an intensity varying in accordance with the scene or object brightness, are reflected towards the opening or viewing slot 14 at the rear of the cover 11.

I have furthermore shown a pair of endless bands or strips 15 and 16 of Celluloid or similar flexible material and arranged to move around guide posts or rollers 17a, 17b, 17c, 17d and 18a, 18b, 18c, 18d, respectively. Strip 15 has applied thereto a photographic wedge by a suitable such as a photographic process corresponding to the wedge w of Figure 1, while the strip 16 of transparent or translucent material is provided with an index painted or otherwise produced thereon and corresponding to the index i of Figure 1. In order to adjust said index relative to the wedge on strip 15 in the manner described, both strips are provided with perforations at their upper edge which perforations engage suitable sprockets or gears 20 and 21, respectively. Sprocket 21 is mounted upon the end of a shaft 23 journaled in the top 11 and carrying an adjusting knob 24 which has a pointer moving along a scale representing lighting conditions marked B, C, D, corresponding to "Bright," "Cloudy" and "Dull," respectively, and serving for setting the index on strip 16 to the proper position for taking into account the effect of the varying eye sensitivity in substantially the same manner as described with reference to Figure 1.

Sprocket 20 is mounted upon a shaft 22 also journaled in the top 11 and having a circular scale 25 secured to its upper end. Scale 25 has a knurled edge and is placed within a corresponding recess in the top 11. The peripheral section of this scale is provided with a series of F-numbers similar to and corresponding to the scale $s_1$ of Figure 1. Secured to the top 11 in any suitable manner is a plate 26 provided with recesses to show the aperture numbers on scale 25 and serving to hold in place the latter and enable its rotation by gripping the knurled edge thereof which projects through suitable recesses 27 in the casing 10 and top 11. In this manner, rotation of scale 26 causes a simultaneous operation of the wedge on strip 15 in substantially the same manner as described in connection with Figure 1. A further adjustable ring-shaped scale 28 calibrated in exposure time values and corresponding to the scale $s_2$ of Figure 1 is mounted upon plate 26 concentrically to scale 25 and retained by the upturned edge by a third circular scale 30 carrying film speed graduations and fitting inside scale 28 in rigidly secured relation to plate 26. Scale 28 may be adjusted by the aid of knob 31 having a pointer in cooperative relation with the scale of film speed graduations on the central disc 30.

Other details of construction and operation will be evident from the description of the schematic diagram according to Figure 1. In operation, the meter is held with the front end or plate 12 facing the object or scene to be photographed and disc 25 is rotated until the index $i'$ in the viewing slot 14 viewed in the direction of the arrow E becomes just barely visible in the manner described, whereupon scales 25 and 28 will be properly aligned for the correct exposure reading, provided both film speed and lighting condition adjustment have been previously carried out in the manner understood from the foregoing. Plate 12 and the distance therefrom of the wedge on the strip 15 are suitably chosen so as to obtain a desired acceptance angle $\alpha$ corresponding to the field angle of a camera, to cause only such light as will affect the sensitive film or plate in the camera to determine the exposure indication in accordance with customary practice.

Referring to Figure 5, I have shown a schematic diagram for an automatic exposure control system suitable for structural combination with a camera and embodying the principles of the invention. For this purpose, I have provided a pair of photometric wedges $w_1$ and $w_2$ arranged to be moved past an index $i$ which latter may be arranged between said wedges as shown or beneath the lower wedge ($w_2$) if desired. Wedge $w_1$ is coupled with one of the shutter controls of a camera such as the aperture control gear $c_1$ as indicated in the drawings by way of intermediate gear or sprocket $g_1$ engaging the perforations $h$ and meshing with the gear $c_1$. Similarly, wedge $c_2$ is coupled with the other shutter control, in the example illustrated the exposure time control gear $c_2$ through an intermediate gear $g_2$ engaging perforations $h$ of wedge $w_2$ and meshing with the gear $c_2$. With an arrangement of this type it is possible, by the proper design of the wedges $w_1$ and $w_2$ and of the coupling or gearing ratios, to adjust either or both controls to a desired value and to obtain the correct setting of the coordinated control by moving the associate adjusting element to a point where the index $i'$ in the viewing slot of the exposure meter suitably built in the camera becomes barely visible in the manner described in the foregoing.

In the example illustrated, adjustment of control $c_1$ in the direction of arrow F or decreasing lens aperture will result in the wedge $w_1$ moving towards the left in the direction of arrow F'. Thus, assuming wedge $w_2$ and the corresponding exposure time setting to remain unchanged, an increase of the object brightness or intensity of the incident light rays B will make it necessary to move a denser portion of wedge $w_1$ to the position opposite to the pointer $i$ so as to cause index $i'$ to just disappear, i. e., in the direction of decreasing lens aperture as should be the case if all other conditions have remained unchanged.

In a similar manner, assuming a constant aperture or adjustment of the control $c_1$, an increased object brightness will necessitate a movement of wedge $w_2$ in the direction of the arrow $G'$ by adjusting control $c_2$ in the direction of decreasing exposure time.

It is thus possible by means of an arrangement aforedescribed, substantially without the necessity of reading and transferring of any adjusting numbers, to select any of the coordinated aperture and exposure time values desired to suit existing exposure determining conditions and to obtain the proper setting of the coordinated exposure control organ in a substantially automatic manner by causing the disappearance or extinguishment of the test mark or index $i'$ in the manner described. The varying eye sensitivity is again taken into account in the same manner as described hereinbefore by setting the pointer $i$ by means of the knob $k_2$ to the proper position relative to the scale of lighting conditions marked "Bright," "Cloudy" and "Dull" in a manner similar to that according to Figure 1.

In order to consider several film speeds, the scale of lighting conditions is in turn made adjustable relative to a fixed film speed scale by applying the same to an adjustable plate $p$ having a knob $k_3$ provided with an index movable along the scale of film speed numbers as shown in the drawings.

In operation, scale plate $p$ is first set by the aid of knob $k_3$ in either the directions of arrows Y so that its index is opposite to the number representing the speed of the film or plate used in the camera. This adjustment will remain constant as long as the same film is used by the photographer. Pointer $i$ is then set prior to an exposure adjustment by the aid of knob $k_2$ so that its index will be opposite to the mark identifying the existing lighting conditions indicated on scale plate $p$. Thus, adjustment of knob $k_3$ to a higher film speed number such as from 2 to 3 as shown in the drawings will necessitate a greater rotation of either of the controls $s_1$ and $s_2$ in the direction of arrows F and G or movement of the wedges $w_1$ or $w_2$ in the direction of arrows $F'$ and $G'$, respectively, resulting in a smaller aperture or decreased exposure time as should be the case if a more sensitive film is used as assumed. Similar compensation is obtained in case of a lower film speed adjustment in that the lens aperture or exposure time will have to be increased in order to cause index $i'$ to disappear or remain just barely visible in the viewing slot.

Referring to Figures 6 to 9, I have shown by way of example a structural embodiment of a camera with a built-in exposure meter constructed in accordance with the general layout shown in Figure 5. The camera shown is of the well known collapsible bellows roll film type comprising substantially a body member 35, a lens and shutter housing 36 containing the objective and shutter mechanism and being collapsibly connected with the body 35 through a bellows 37 and a lazy tong or similar linkage mechanism 38 or in any other suitable manner well known in the art. Numeral 40 indicates the lens of the camera projecting from housing 36; 41 are the film spools; 42 indicates the film drawn past the film or picture gate in the focal plane of the lens by means of suitable winding and rewinding knobs 43 and 44; 45 and 46 are the adjusting knobs for setting the lens aperture and exposure time which move within arcuate slots 47 and 48, respectively, in the front of the shutter housing and are provided with pointers cooperating with the respective adjusting scales 50 and 51, all these and further details being of standard design and forming no part of the invention.

The aperture and exposure time controls are provided with gears 52 and 53, corresponding to the controls $c_1$ and $c_2$ of Figure 5 and meshing with intermediate gears 56 and 57 which in turn engage the perforations of a pair of endless wedge bands 54 and 55, respectively, each arranged to move around four guide posts or rollers, one inside the other and corresponding to wedges $w_1$ and $w_2$ of Figure 5. Item 58 indicates a pointer corresponding to pointer $i$ of Figure 5 arranged to move between the upper sections of the bands 54 and 55 and guided within a slot 59 in the rear wall of housing 36. The projecting end of pointer 58 carries an adjusting knob 60 which has an index arranged to move along an adjustable scale plate 61 calibrated in lighting conditions and slidably mounted upon the rear wall of housing 36. Scale 61 in turn has an adjusting knob 62 and an index 63 the latter being arranged to cooperate with a film speed scale marked 1, 2 and 3 and directly applied to the rear wall of housing 36. This arrangement is substantially identical to and operated in the same manner as described in detail with reference to Figure 5.

The light from the photographic scene or object enters the meter through a diffusing plate 64 mounted in the front wall of casing 36 above the lens and shutter mechanism and is reflected in an upward direction by a mirror 65, mounted between the upper and lower sections of the wedge bands or strips 54 and 55, towards the viewing slot 66 in the top wall of housing 36 wherein appears test mark or index 58' corresponding to index $i'$ of Figure 5.

The space on either side of the exposure meter may be advantageously utilized for the mounting of the component parts of a view finder 67 and a range finder 68 which may be advantageously of the rotary wedge type having an adjusting wheel 69, the cooperating parts and the viewing window 70 being suitably mounted upon the rear portion on the top of the camera body 35 in a manner well understood by those skilled in the art.

While I have shown and described a few desirable embodiments of my invention, it is understood that this disclosure is for the purpose of illustration and that various changes in shape, proportion and arrangement of parts as well as the substitution of equivalent elements for those herein shown and described may be made without the parting from the spirit and scope of the invention as set forth in the appended claims.

I claim:

1. An extinction type visual exposure meter comprising a body, an elongated photometric wedge carried by said body and arranged to have one side thereof irradiated by light rays emanating from a photographic scene in the operative position of the meter, index means also carried by said body and arranged in the path of said light rays to produce a shadow test mark upon said wedge, when said wedge held at a distance from the observer's eye in the operative position of the meter is viewed in a direction opposite to said light rays, means for longitudinally moving said wedge relative to said body and past said index means, whereby the extent of displacement to cause said mark to become just barely visible is a measure of the scene brightness, exposure determining means carried by said body comprising adjustable means positively coupled to said wedge moving means, a stationary scale upon said body having graduations representing values of general lighting conditions, and further means in cooperative relation to said scale for adjusting the position of said index means relative to said body in the longitudinal direction of said wedge, to substantially compensate for the error in the final exposure adjustment due to the varying eye sensitivity under different general lighting conditions to which the eye is exposed, at least a portion of said wedge equal to the adjusting range of said index means being visible to the observer.

2. An extinction type visual exposure meter comprising a body, an elongated photometric wedge carried by said body and arranged to have one side thereof illuminated by light rays emanating from a photographic scene in the operative position of said meter, index means also carried by said body and arranged in the path of said light rays adjacent to said wedge to produce a shadow test mark upon said wedge, when the wedge is viewed in a direction opposite to said light rays, means for longitudinally moving said wedge relative to said body and past said index means, whereby the extent of displacement to cause said mark to become just barely visible is a measure of the scene brightness, adjustable means carried by said body for determining the lens aperture and exposure time for a photographic camera, a positive coupling connection between said adjustable means and said wedge moving means, a stationary scale upon said body having graduations representing values of an additional exposure controlling factor, and further means in cooperative relation to said scale for adjusting the position of said index means relative to said body in the longitudinal direction of said wedge, at least a portion of said wedge equal to the adjusting range of said index means being visible to the observer.

3. An extinction type visual exposure meter comprising a body, an elongated photometric wedge carried by said body and arranged to have one side thereof irradiated by light rays emanating from a photographic scene in the operative position of said meter, opaque index means also carried by said body and arranged in the path of said light rays adjacent to said wedge to produce a shadow test mark upon said wedge, when the wedge held at a distance from the observer's eye in the operative position of the meter is viewed in a direction opposite to said light rays, means for longitudinally moving said wedge relative to said body and past said index means, whereby the extent of displacement to cause said mark to become just barely visible is a measure of the scene brightness, an exposure calculator carried by said body and comprising movable scale means positively coupled with said wedge moving means for translating a given scene brightness into exposure control values for a photographic camera, a stationary scale upon said body having graduations representing values of general lighting conditions, and further means in cooperative relation to said scale for adjusting the position of said index means relative to said body and in the longitudinal direction of said wedge, to substantially compensate for the error in the final exposure adjustment due to the varying eye sensitivity under different lighting conditions to which the eye is exposed, at least a portion of said wedge equal to the adjusting range of said index means being visible to the observer.

4. The combination with a photographic camera comprising a body and adjustable lens aperture and exposure time control means mounted upon said body, of an extinction type exposure meter embodied in said camera comprising an elongated photometric wedge carried by said body and arranged to have one side thereof illuminated by light rays emanating from a photographic scene in the operative position of said meter, index means carried by said body and arranged in the path of said light rays adjacent to said wedge to produce a shadow test mark upon said wedge, when the wedge is viewed in a direction opposite to said light rays, means for moving said wedge in the longitudinal direction relative to said body and past said index means, whereby the extent of displacement to cause said mark to become just barely visible is a measure of the scene brightness, a positive coupling connection between said wedge moving means and one of said exposure control means, a stationary scale upon said body having graduations representing values of an additional exposure controlling factor, and further means in cooperative relation to said scale for adjusting the position of said index means relative to said body in the longitudinal direction of said wedge, at least a porton of said wedge equal to the adjusting range of said index means being visible to the observer.

5. The combination with a photographic camera comprising a body and adjustable lens aperture and exposure time control means mounted upon said body, an extinction type exposure meter embodied in said camera comprising an elongated photometric wedge carried by said body and arranged to have one side thereof illuminated by light rays emanating from a photographic scene in the operative position of said meter, index means carried by said body and arranged in the path of said light rays adjacent to said wedge to produce a shadow test mark upon said wedge, when the wedge in the operative position held at a distance from the observer's eye is viewed in a direction opposite to said light rays, means for moving said wedge in the longitudinal direction relative to said body and past said index means, whereby the extent of displacement to cause said mark to become just barely visible is a measure of the scene brightness, a positive coupling connection between said wedge moving means and one of said exposure control means, a stationary scale upon said body having graduations representing values of general lighting conditions, and further means in cooperative relation to said scale for adjusting the position of said index means relative to said body and in the longitudinal direction of said wedge, to substantially compensate for the error in the final exposure adjustment due to the varying eye sensitivity, at least a portion of said wedge equal to the adjusting range of said index means being visible to the observer.

6. The combination with a photographic camera comprising a body and adjustable lens aperture and exposure time control means mounted upon said body, of an extinction type exposure meter embodied in said camera comprising an elongated photometric wedge carried by said body and arranged to have one side thereof illuminated by light rays emanating from a photographic scene in the operative position of said meter, index means carried by said body and arranged in the path of said light rays adjacent to said wedge to produce a shadow-test mark upon said wedge when the wedge in the operative position held at a distance from the observer's eye is viewed in a direction opposite to said light rays, means for moving said wedge in the longitudinal direction relative to said body and past said index means, whereby the extent of displacement to cause said mark to become just barely visible is a measure of the scene brightness, a positive coupling connection between said wedge moving means and one of said exposure control means, a movable scale member adjustable relative to said body and having scale graduations representing general lighting conditions, further means in cooperative relation to said scale graduations for adjusting the position of said index means relative to said body in the longitudinal direction of said wedge, to substantially compensate for the varying eye sensitivity under different lighting conditions to which the eye is exposed, a further stationary scale upon said body having graduations representing emulsion sensitivity values, and a further index upon said scale member in cooperative relation to said last mentioned graduations, at least a portion of said wedge equal to the adjusting range of said index means being visible to the observer.

7. The combination with a photographic camera comprising a body and adjustable lens aperture and exposure time control means mounted upon said body, of an extinction type exposure meter embodied in said camera comprising a pair of parallel spaced elongated photometric wedges arranged to be illuminated in the operative position of said meter by light rays emanating from a photographic scene and successively passing through said wedges in one direction, index means carried by said body and arranged in the path of said light rays to produce a shadow test mark upon the wedge on the side opposite to and viewed in the direction opposite to said light rays, means for moving each of said wedges in the longitudinal direction relative to said body and past said index means, a positive coupling connection between each of said lens aperture and exposure time control means and one of said wedge moving means, stationary scale means upon said body having graduations representing values of an additional exposure controlling factor, and further means in cooperative relation to said scale means for adjusting the position of said index means relative to said body and in the longitudinal direction of said wedges, at least a portion of said wedges equal to the adjusting range of said index means being visible to the observer.

8. The combination with a photographic camera comprising a body and adjustable lens aperture and exposure time control means mounted upon said body, of an extinction type exposure meter embodied in said camera comprising a pair of spaced parallel elongated photometric wedges arranged to be illuminated in the operative position of said meter by light rays emanating from a photographic scene and successively passing through said wedges in one direction, index means carried by said body and arranged in the path of said light rays to produce a shadow test mark upon the wedge on the side opposite to and viewable in the direction opposite to said light rays, means for moving both said wedges in the longitudinal direction relative to said body and past said index means, a positive coupling connection between each of said lens aperture and exposure time control means and one of said wedge moving means, stationary scale means upon said body having graduations representing values of general lighting conditions, and further means in cooperative relation with said scale means for adjusting said index means relative to said body and in the longitudinal direction of said wedges, to compensate for the error in the final exposure adjustment due to the varying eye sensitivity under different general lighting conditions to which the eye is exposed, at least a portion of said wedges equal to the adjusting range of said index means being visible to the observer.

9. The combination with a photographic camera comprising a body and adjustable lens aperture and exposure time control means mounted upon said body, of an extinction type exposure meter embodied in said camera comprising a pair of parallel spaced elongated photometric wedges arranged to be illuminated in the operative position of said meter by light rays emanating from a photographic scene and successively passing through said wedges in one direction, index means carried by said body and arranged in the path of said light rays to produce a shadow test mark upon the wedge on the side opposite to and viewable in the direction opposite to said light rays, means for moving said wedges in the longitudinal direction relative to said body and past said index means, a positive coupling connection between each of said lens apertures and exposure time control means and one of said wedge moving means, a movable scale member adjustable relative to said body and carrying scale graduations representing general lighting conditions, further means in cooperative relation with said scale graduations for adjusting the position of said index means relative to said body and in the longitudinal direction of said wedges, to substantially compensate for the error in the final exposure adjustment due to the varying eye sensitivity under different lighting conditions to which the eye is exposed, a further stationary scale upon said body having graduations representing values of emulsion sensitivity, and a further index upon said scale member in cooperative relation to said last mentioned scale graduations, at least a portion of said wedge equal to the adjusting range of said index means being visible to the observer.

KARL RATH.